(12) United States Patent
Benedettini

(10) Patent No.: US 6,588,375 B2
(45) Date of Patent: Jul. 8, 2003

(54) ANIMAL WASTE COLLECTION AND DISPOSAL APPARATUS AND SUB-ASSEMBLY FOR THE SAME

(76) Inventor: Robert Benedettini, 173 Mark Dr., Mt. Clemens, MI (US) 48043

( * ) Notice: Subject to any disclaimer, the term of this patent is extended or adjusted under 35 U.S.C. 154(b) by 0 days.

(21) Appl. No.: 09/934,466

(22) Filed: Aug. 21, 2001

(65) Prior Publication Data

US 2003/0037733 A1 Feb. 27, 2003

(51) Int. Cl.[7] .......................... A01K 27/00; A01K 23/00
(52) U.S. Cl. ...................................................... 119/795
(58) Field of Search ............................ 119/95, 161, 792, 119/793, 795, 858; 221/25, 26, 310; 225/106; 242/55.2, 55.53; 294/1.3–1.5

(56) References Cited

U.S. PATENT DOCUMENTS

| | | |
|---|---|---|
| 4,146,260 A | 3/1979 | Carrington |
| 4,148,510 A | 4/1979 | Brack et al. |
| 5,318,330 A | 6/1994 | Dombrowski |
| 5,363,809 A | 11/1994 | Roe |
| 5,441,017 A | 8/1995 | Lindsay |
| 5,564,763 A | 10/1996 | Mercurio |
| 5,634,678 A * | 6/1997 | Bailey .......................... 294/1.5 |
| 5,718,192 A | 2/1998 | Sebastian |
| 5,718,469 A * | 2/1998 | Ockerman ................... 294/1.4 |
| 5,727,500 A * | 3/1998 | Conboy ...................... 119/174 |
| 5,826,547 A | 10/1998 | Gajewska |
| 6,016,772 A * | 1/2000 | Noyes .......................... 119/863 |
| 6,019,067 A | 2/2000 | Carey |
| 6,032,995 A | 3/2000 | Barbaro |
| 6,035,809 A * | 3/2000 | Fingerett et al. ............ 119/796 |
| 6,073,590 A | 6/2000 | Polding |
| 6,085,695 A * | 7/2000 | Miller et al. ................. 119/795 |
| 6,098,860 A * | 8/2000 | Phillips ....................... 224/483 |
| 6,257,473 B1 * | 7/2001 | Ringelstetter ............... 224/675 |

* cited by examiner

Primary Examiner—Charles T. Jordan
Assistant Examiner—Bret Hayes
(74) Attorney, Agent, or Firm—King & Jovanovic, PLC

(57) ABSTRACT

A sub-assembly for use in association with an animal waste collection and disposal apparatus comprising: a retaining member, wherein the retaining member is associable with a leash, and further wherein the retaining member is configured to retain a container for collecting and disposing animal waste; and at least one fastener, wherein the at least one fastener is capable of securing the retaining member to a leash.

25 Claims, 4 Drawing Sheets

ANIMAL WASTE COLLECTION AND DISPOSAL APPARATUS AND SUB-ASSEMBLY FOR THE SAME

BACKGROUND OF THE INVENTION

1. Field of the Invention

The present invention relates in general to an animal waste collection and disposal apparatus and associated sub-assembly, and more particularly, to an animal waste collection and disposal apparatus which allows an animal owner to collect, temporarily store, and/or dispose of animal waste.

2. Background Art

Animal waste collection and disposal apparati have been known in the art for several years, and are the subject of numerous patents, including: U.S. Pat. No. 6,073,590 entitled "Dog Leash with Bag Container;" U.S. Pat. No. 6,032,995 entitled "Apparatus for Retrieval and Disposal of Pet Fecal;" U.S. Pat. No. 6,019,067 entitled "Animal Restraint Storage Receptacle;" U.S. Pat. No. 5,826,547 entitled "Leash;" U.S. Pat. No. 5,718,192 entitled "Leash and Attached Carrying Bag;" U.S. Pat. No. 5,564,763 entitled "Device for Picking Up and Removing Dog Droppings;" U.S. Pat. No. 5,441,017 entitled "Pet Leash with Integral Waste Bag Dispenser;" U.S. Pat. No. 5,363,809 entitled "Pet Sanitation Article Attachable to a Leash Assembly;" U.S. Pat. No. 5,318,330 entitled "Device for Picking Up and Containing Dog Excreta;" U.S. Pat. No. 4,148,510 entitled "Hand Operable Scoop for the Collection and Disposal of Animal Excrement;" and U.S. Pat. No. 4,146,260 entitled "Leash-Holder Scoop for Animal Waste;" all of which are hereby incorporated herein by reference in their entirety.

U.S. Pat. No. 6,073,590 discloses a dog leash equipped with a container for containing a supply of plastic grocery bags for collecting pet excrement. The container is stitched to the leash just below the hand-loop of the leash. The container is of light-weight fabric or material, and takes its structure from being stitched to the leash lengthwise along the container. The open mouth of the container is wrapped around the leash and secured with Velcro.

U.S. Pat. No. 6,032,995 discloses a device for collecting animal waste. The device has an upright standing handle member equipped with a trigger which communicates through a rod in the hollow body of the handle with a lower compartment door assembly for collecting the animal waste. The lower compartment is equipped with a front door which is pivotally connected to the trigger through the rod member. The lower compartment houses a slidably mounted tray which holds a disposable bag member in which the animal waste is placed after it is scooped into the lower compartment. The trigger is also equipped with a locking mechanism to hold the door open while waste is being placed therein.

U.S. Pat. No. 6,019,067 discloses an article-carrying receptacle for attachment to a leash which includes a body portion for holding articles placed therein while providing access to the contents thereof by a free hand of the individual holding the handle portion of the leash in a remaining hand. The receptacle is supportingly securable to the leash for use in a manner permitting one-hand operation of the entry closure by the free hand. In an embodiment the receptacle body portion is in the form of an elongated pouch, receivable in a position proximate a handle portion of a leash, or mounted directly thereto, in the longitudinal direction. A closable opening is provided along the length of the receptacle for accessing the interior thereof, positioned to provide access by a free hand of the individual. In another embodiment, a combination of a receptacle and a handle portion of a leash on which the receptacle is received includes a triangularly configured handle portion, having the shape of either a substantially isosceles or substantially right triangle.

U.S. Pat. No. 5,826,547 discloses a leash for walking, running, and controlling dogs, cats, or even children. The handle of the leash is designed such that a holder can exert greater control over the dog, and the handle is simple, comfortable, economical, and secure.

U.S. Pat. No. 5,718,192 discloses an animal waste carrying bag and leash for carrying articles such as pet waste, waste retrieval articles, bags, and personal belongings. The carrying bag may be attached to the pet leash or carried by hand. A name plate on the carrying bag provides identification of the owner and a fluorescent strip on the carrying bag provides for safer walking at night. The apparatus allows for a cleaner, more dignified way of transporting pet waste.

U.S. Pat. No. 5,564,763 discloses a device for picking up and removing dog droppings and the like including a pair of clamshell shaped members each having a concaved inner surface which face one another and are held for pivotal movement near spaced first side margins of the clamshell shaped members by a biased hinge connection therebetween. Elongated spaced arcuate fingers are formed into each clamshell shape member which extend from a second side margin to a central portion of each clamshell shaped member. Two opposing spaced handles each extend from the first side margin, when held and squeezed together, separate the second side margins defined by the spaced distal ends of the fingers. A flexible disposable bag of thin plastic is operably positionable between the opened clamshell spaced members. The bottom of the bag is placed furthest into the space therebetween while an open end portion of the bag is turned inside out and positioned against an exterior convex surface of each clamshell shaped member, including the fingers. Retaining loops formed at each corner of the open end of the bag supportively engage around holding tabs which extend in either direction from each end margin of at least one clamshell shaped member.

U.S. Pat. No. 5,441,017 discloses an accessory for use with pets, particularly dogs, which has a leash of conventional construction to which is mounted to a preferably removable disposable bag dispenser which houses a roll of disposable bags dispensed through a slit in the side of the housing as needed for use in cleaning the pet's waste. In the preferred embodiment a scoop is built integrally with the end of the dispenser housing.

U.S. Pat. No. 5,363,809 discloses a concealed pet waste disposal bag carrier which appears as a decorative bow when attached to a pet collar. The carrier includes two pouches each of which carries several plastic bags, each plastic bag being adapted for the sanitary retrieval and disposal of pet waste.

U.S. Pat. No. 5,318,330 discloses a device for scooping up and containing dog excreta for later removal comprising two engaging parts, one part of which serves as a scoop for use in scraping excreta into the hollow interior of the other part. A handle comprising two parts is provided which parts individually serve to each support a different one of the parts and when the parts are moved into engagement interlock to form a single handle for supporting the assembled device.

U.S. Pat. No. 4,148,510 discloses a container which is formed from a pair of concave shell halves with each shell half having a small upper portion and a lower portion which is larger than the upper portion. The shell halves are connected by an integral hinge at their respective upper portions. The smaller upper portions are sized to be easily received in and encompassed by the fingers of a user. The lower portions are provided with straight edges which are disposed remote from the integral hinge. The shell halves are constructed so that they can be manipulated from their normally biased open configuration to a closed configuration about animal excrement. As the shell halves are so manipulated the straight edges scrape the animal excrement into the container. In one embodiment when the shell halves are in their closed configuration, the straight edges are in telescoping relationship and a locking structure is provided along at least the straight edges to lock the shell halves in their closed relationship thereby effectively sealing the container. In an alternative embodiment, the straight edges, when the shell halves are in the closed configuration, abut each other and a locking structure disposed on the edges of the shell halves locks the shell halves in their closed relationship.

U.S. Pat. No. 4,146,260 discloses a leash-holder scoop for animal waste for collecting droppings while walking the pet on a leash by holding a plastic throw-away bag under the pet. The bag is removably secured to a bent tube attached to a handle having a leash latch pivoted thereon. The rim of the holder is narrow so that it can be used for picking up droppings. The bag holder is a round sleeve with a flat segment holding elastic fitting around the top of the bag and holding it against the sleeve.

While many of the above-identified devices do appear to provide a means for collecting and disposing animal waste, their configurations remain non-desirous and/or problematic inasmuch as, among other reasons, none of the above-identified devices appear to enable a user to inexpensively collect and dispose of animal waste without undesirable contact through, for example, a conventional plastic bag, which can be extremely grotesque. Other devices which remotely collect animal waste appear to be quite significant in size which can be very inconvenient during a walk.

It is therefore an object of the present invention, to provide an animal waste collection and disposal apparatus and associated sub-assembly which, among other things, remedies the aforementioned detriments and/or complications associated with the use of the above-identified devices.

SUMMARY OF THE INVENTION

The present invention is directed to a sub-assembly for use in association with an animal waste collection and disposal apparatus comprising: (a) a retaining member, wherein the retaining member is associable with a leash, and further wherein the retaining member is configured to retain a container for collecting and disposing animal waste; and (b) at least one fastener, wherein the at least one fastener is capable of securing the retaining member to a leash.

In a preferred embodiment of the present invention, the retaining member comprises an inner peripheral geometry which is capable of substantially embracing the outer peripheral geometry of an associated container.

In another preferred embodiment of the present invention, the inner peripheral geometry of the retaining member further includes a lining member for enhancing frictional securement between the retaining member and an associated container.

Preferably, the retaining member comprises a substantially circular inner peripheral geometry which is capable of substantially embracing the outer peripheral geometry of an associated container.

In accordance with the present invention, the inner peripheral geometry of the retaining member further includes a lining member for enhancing frictional securement between the retaining member and an associated container.

In a preferred embodiment of the present invention, the inner peripheral geometry of the retaining member is adjustable.

In yet another preferred embodiment of the invention, the at least one fastener releasably secures the retaining member to a leash.

Preferably, the sub-assembly further comprises a container releasably retained within the retaining member.

In accordance with the present invention, the container comprises a cup having a substantially circular outer peripheral geometry.

In a preferred embodiment of the present invention, the retaining member is secured to a leash.

In yet another preferred embodiment of the present invention, the retaining member is pivotally attached to the leash.

The present invention is further directed to a sub-assembly for use in association with an animal waste collection and disposal apparatus comprising: (a) a retaining member, wherein the retaining member is configured to retain a container for collecting and disposing animal waste; (b) a rod, wherein the rod is associated with the retaining member and associable with a leash, and further wherein the rod is suspendable in a substantially vertical orientation from an associated leash; and (c) a fastener, wherein the fastener is capable of securing the rod to a leash.

In a preferred embodiment of the present invention, the fastener releasably secures the rod to a leash.

In yet another preferred embodiment of the invention, the rod is pivotally attached to the leash.

Preferably, a rod end proximate the retaining member comprises a weighting member.

The present invention is also directed to an animal waste collection and disposal apparatus comprising: (a) a leash, wherein the leash includes a top surface and a bottom surface and two pegs spaced apart from one another; and (b) a retaining member sub-assembly, wherein the retaining member sub-assembly includes first and second connecting rods positioned between the two retaining members, wherein the first and second connecting rods are positioned between the two pegs, and wherein the first connecting rod is positioned above the top surface of the leash and the second connecting rod is positioned below the bottom surface of the leash.

The present invention is further directed to an animal waste collection and disposal apparatus comprising: (a) a leash, wherein the leash includes a top surface, a bottom surface, and an aperture having a substantially circular inner peripheral geometry; (b) a retaining member, wherein the retaining member is configured to retain a container for collecting and disposing animal waste; (c) a rod, wherein the rod comprises an outer peripheral geometry less than the inner peripheral geometry of the aperture of the leash, and wherein the rod includes an end which emanates from the bottom surface of the leash through the aperture, and further wherein the rod is suspendable in a substantially vertical orientation; and (d) a fastener, wherein the fastener is associated with the top surface of the leash and secured to the end of the rod which emanates through the aperture.

BRIEF DESCRIPTION OF THE DRAWINGS

The invention will now be described with reference to the drawings wherein.

DETAILED DESCRIPTION OF THE INVENTION

Figure 1:
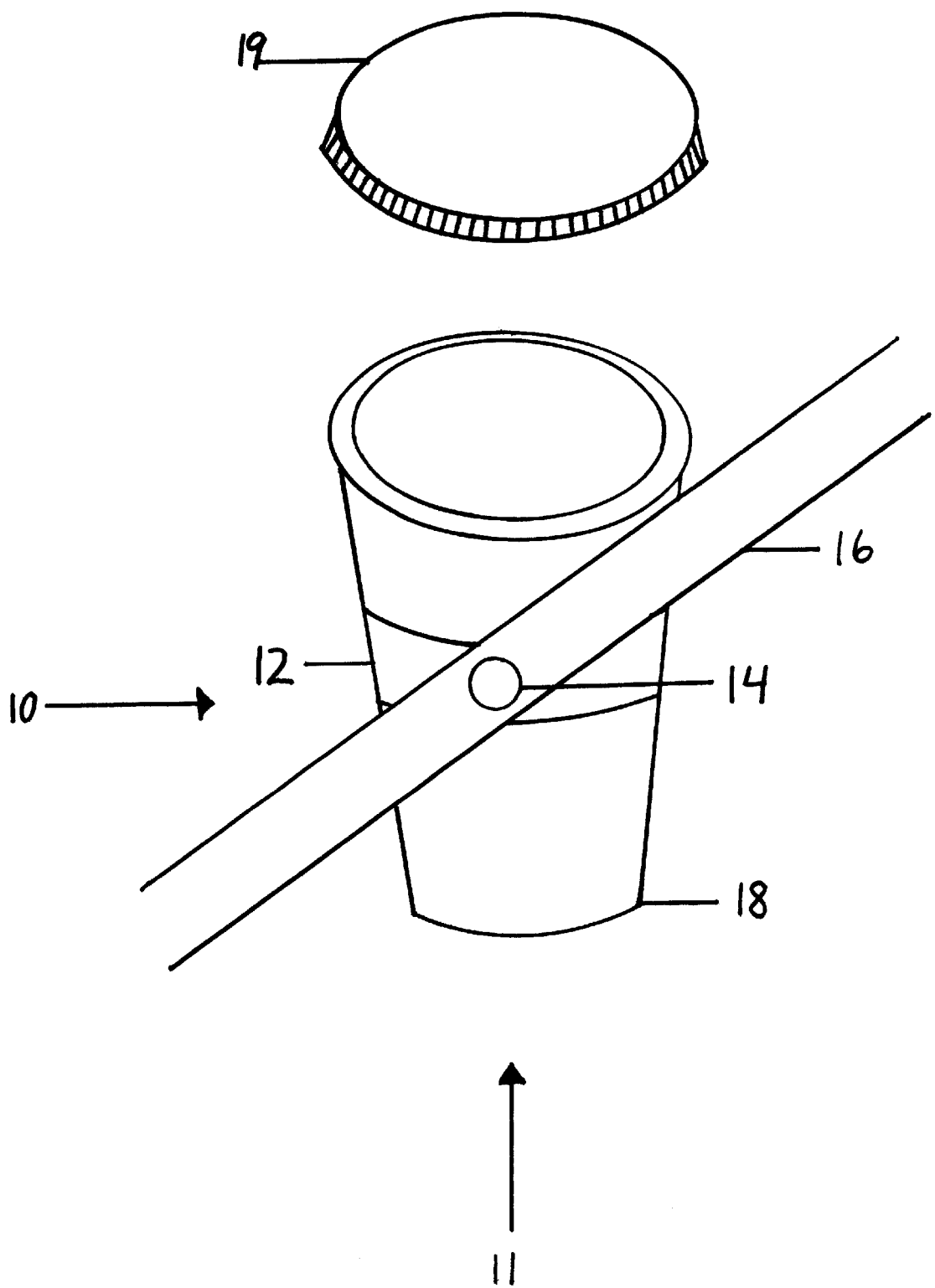
FIG. 1 of the drawings is a fragmented perspective view of a first embodiment of an animal waste collection and disposal apparatus fabricated in accordance with the present invention.

While this invention is susceptible of embodiment in many different forms, there is shown in the drawings and described herein in detail several specific embodiments with the understanding that the present disclosure is to be considered as an exemplification of the principles of the invention and is not intended to limit the invention to the embodiments illustrated.

It will be understood that like or analogous elements and/or components, referred to herein, may be identified throughout the drawings with like reference characters.

Referring now to the drawings, and to FIG. 1 in particular, a perspective schematic representation of a first embodiment of sub-assembly 10 for use in association with animal waste collection and disposal apparatus 11 is shown, which generally comprises retaining member 12 and at least one fastener 14. Animal waste collection and disposal apparatus 11 generally comprises the components of sub-assembly 10 in conjunction with leash 16 and container 18 which optionally comprises lid 19. It will be understood that FIG. 1 is merely a schematic representation of sub-assembly 10 and animal waste collection and disposal apparatus 11. As such, some of the components may be distorted from their actual scale for pictorial clarity.

Retaining member 12 is associable with leash 16 and is configured to retain container 18 for collecting and disposing animal waste. Retaining member 12 may be fabricated from natural and/or synthetic resins, plastics, woods, metals, composites, and/or combinations thereof. Retaining member 12 comprises an inner peripheral geometry which is capable of substantially embracing the outer peripheral geometry of associated container 18. For example, retaining member 12 may comprise a substantially circular inner peripheral geometry which is capable of substantially embracing the outer peripheral geometry of associated cup-shaped container 18. While retaining member 12 has been disclosed as having a fixed inner peripheral geometry, it will be understood that the inner peripheral geometry of retaining member 12 may be adjustable to fit any one of a number of sizes and shapes of containers 18 via numerous mechanisms that would be known to those with ordinary skill in the art having the present disclosure before them. Therefore, container 18 may be provided with apparatus 11 or, alternatively, the animal owner may use any container available in conjunction with sub-assembly 10—such as, for example, disposable paper, plastic, and/or Styrofoam cups. The inner peripheral geometry of retaining member 12 may further include lining member 20 (FIG. 3) for enhancing frictional securement between retaining member 12 and associated container 18.

The lining member may be fabricated from, for example, foams, rubbers, adhesives, including adhesive tapes, and/or any material which enhances frictional securement between the materials of retaining member 12 and container 18. Moreover, retaining member 12 may be pivotally associated with leash 16, thereby enabling container 18 to remain substantially vertical during a conventional walk with, for example, a dog.

At least one fastener 14 is capable of securing retaining member 12 to leash 16. It will be understood that any one of a number of fasteners are suitable for use with the present invention, such as non-threaded fasteners, threaded fasteners, snaps, buttons, rivets, clamps, and/or stitching. It will be further understood that retaining member 12 may or may not be releasably secured to leash 16 via fastener 14.

Leash 16 may comprise a component of apparatus 11, but sub-assembly 10 is configured such that it allows retaining member 12 to be attachable to any leash by a fastener. Leash 16 may be fabricated from any one of a number of materials, including leather, nylon, linked chain, cloth, plastic, and/or combinations thereof.

Similar to leash 16, container 18 may comprise a component of apparatus 11, but sub-assembly 10 is configured such that it enables retaining member 12 to conform to any shape or size container so that the animal owner may use whatever container is available to them. A lid may or may not fit over at least a portion of the top of container 18. Preferably, container 18 is fabricated from a material such as natural and/or synthetic resins, plastics, woods, metals, composites, and/or combinations thereof which allow the animal owner to collect animal waste without the grotesque nature associated with collecting animal waste through a plastic bag. Preferably, container 18 is fabricated from a disposable material which allows the animal owner to economically dispose of the waste while inside container 18, thereby alleviating any or all necessary washing and/or reusing of container 18. However, the animal owner may prefer a non-disposable container. In such a case, containers fabricated from plastic may be the most appropriate.

Figure 2:
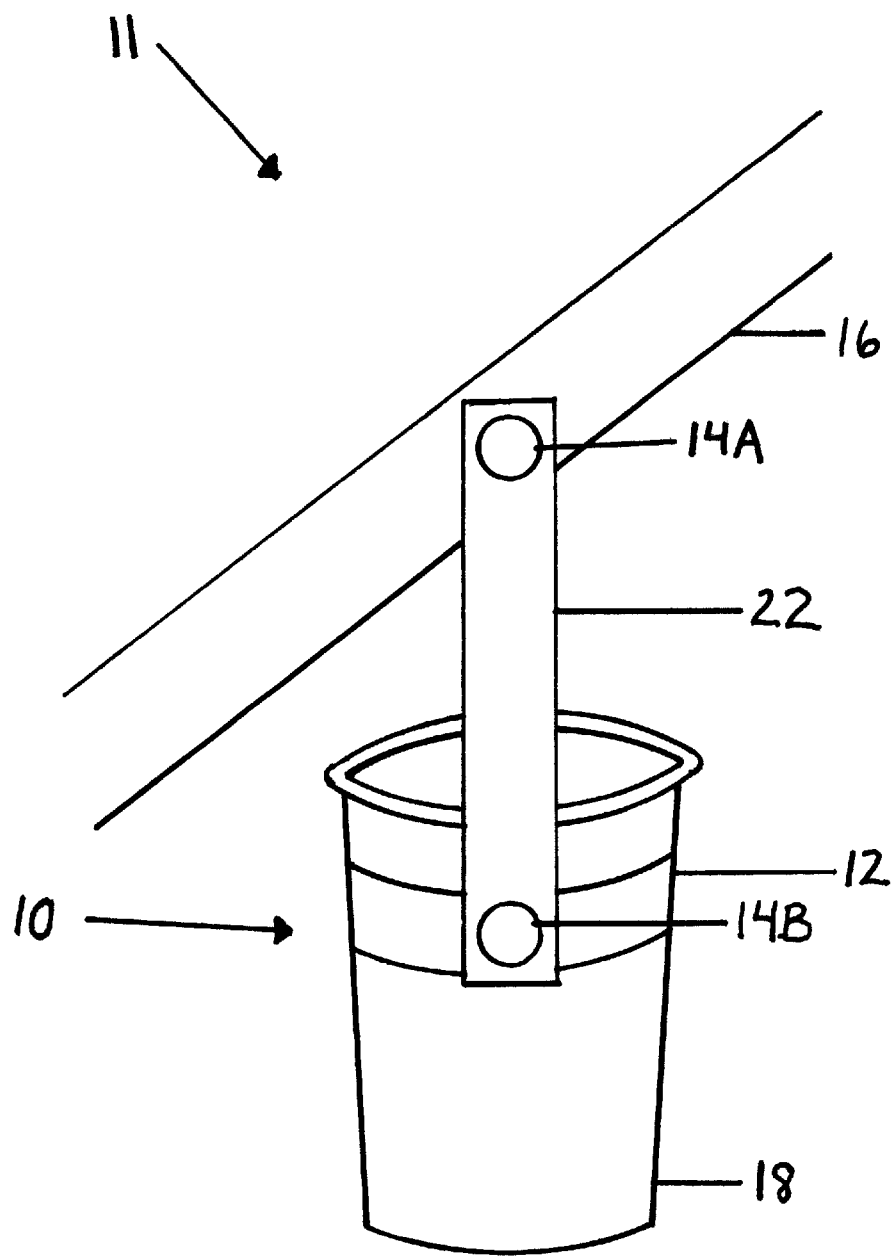
FIG. 2 of the drawings is a fragmented perspective view of a second embodiment of an animal waste collection and disposal apparatus fabricated in accordance with the present invention.

Referring now to FIG. 2, a second embodiment of sub-assembly 10 is shown as including rod 22 which is associated with both retaining member 12 and leash 16 via second fastener 14B and first fastener 14A, respectively. For purposes of the present disclosure, first and second fasteners 14A and 14B may comprise non-threaded fasteners, threaded fasteners, snaps, buttons, rivets, clamps, adhesives, and/or stitching. It will be further understood that retaining member 12 and/or leash 16 may optionally be releasably secured to rod 22 via second fastener 14B and first fastener 14A, respectively. Rod 22 is pivotally suspendable in a substantially vertical orientation from leash 16. Moreover, rod 22 may be pivotally connected to leash 16, thereby enabling container 18 to remain substantially vertical during a conventional walk with, for example, a dog. Rod 22 may be fabricated from, for example, natural and/or synthetic resins, plastics, woods, metals, alloys, composites, and/or combinations thereof.

Figure 3:
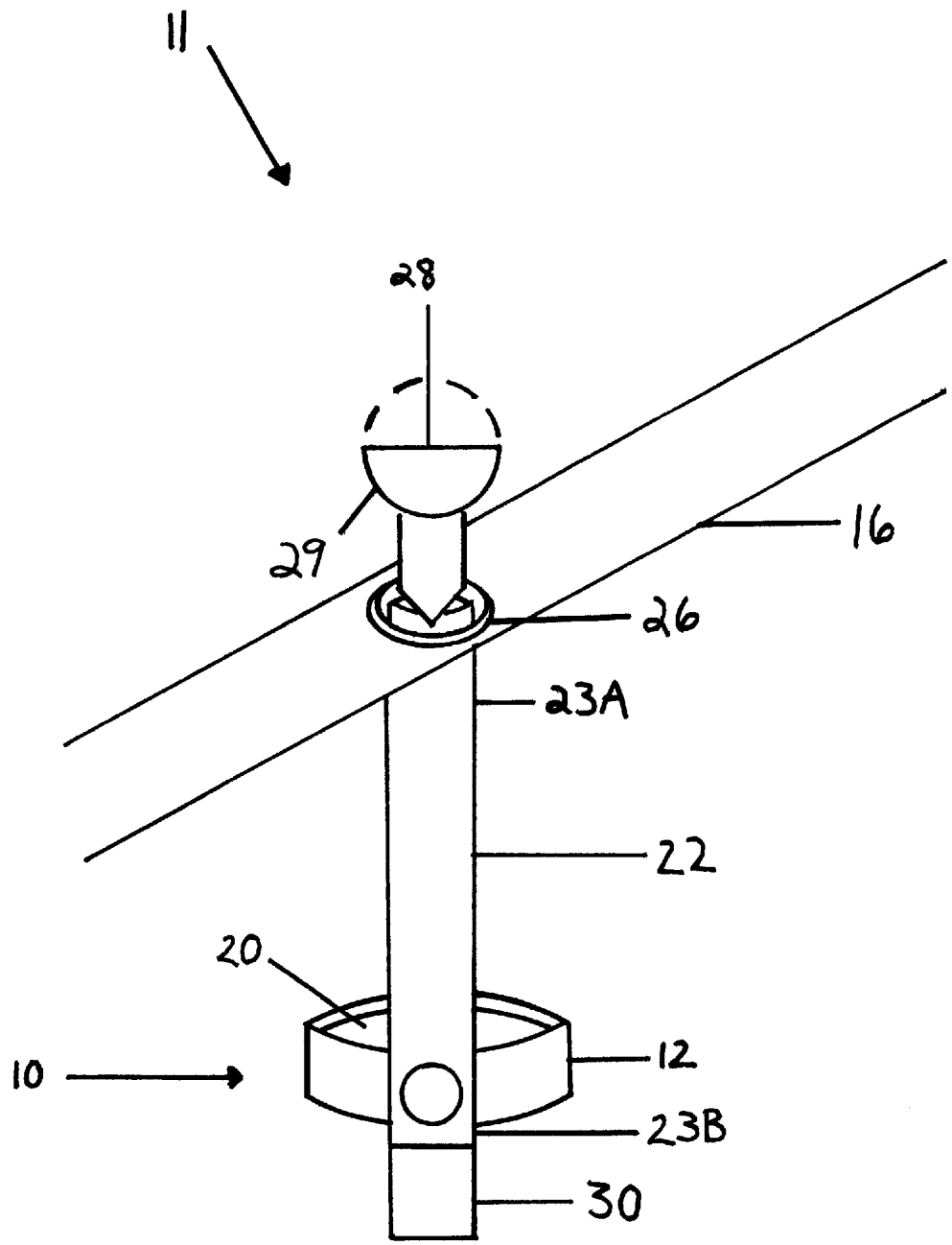
FIG. 3 of the drawings is a fragmented perspective view of a third embodiment of a sub-assembly associated with a leash fabricated in accordance with the present invention.

As is shown in FIG. 3, a third embodiment of animal waste collection and disposal apparatus 11 includes leash 16 which may comprise aperture 26 having a substantially circular inner peripheral geometry. In this embodiment of the invention, rod 22 comprises an outer peripheral geometry less than the inner peripheral geometry of aperture 26 of leash 16. Rod 22 includes end 23A which emanates from the bottom surface of leash 16 through aperture 26 and is suspendable in a substantially vertical orientation. Rod fastener 28 is associated with the top surface of leash 16 and is secured to end 23A of rod 22 which emanates through aperture 26. Rod fastener 28 comprises substantially spherical lower region 29 which contacts aperture 26 and, in turn, cooperatively facilitates vertical positioning of rod 22. Rod 22 may comprise a weighting member 30 at the rod end 23B proximate the retaining member 12.

Figure 4:
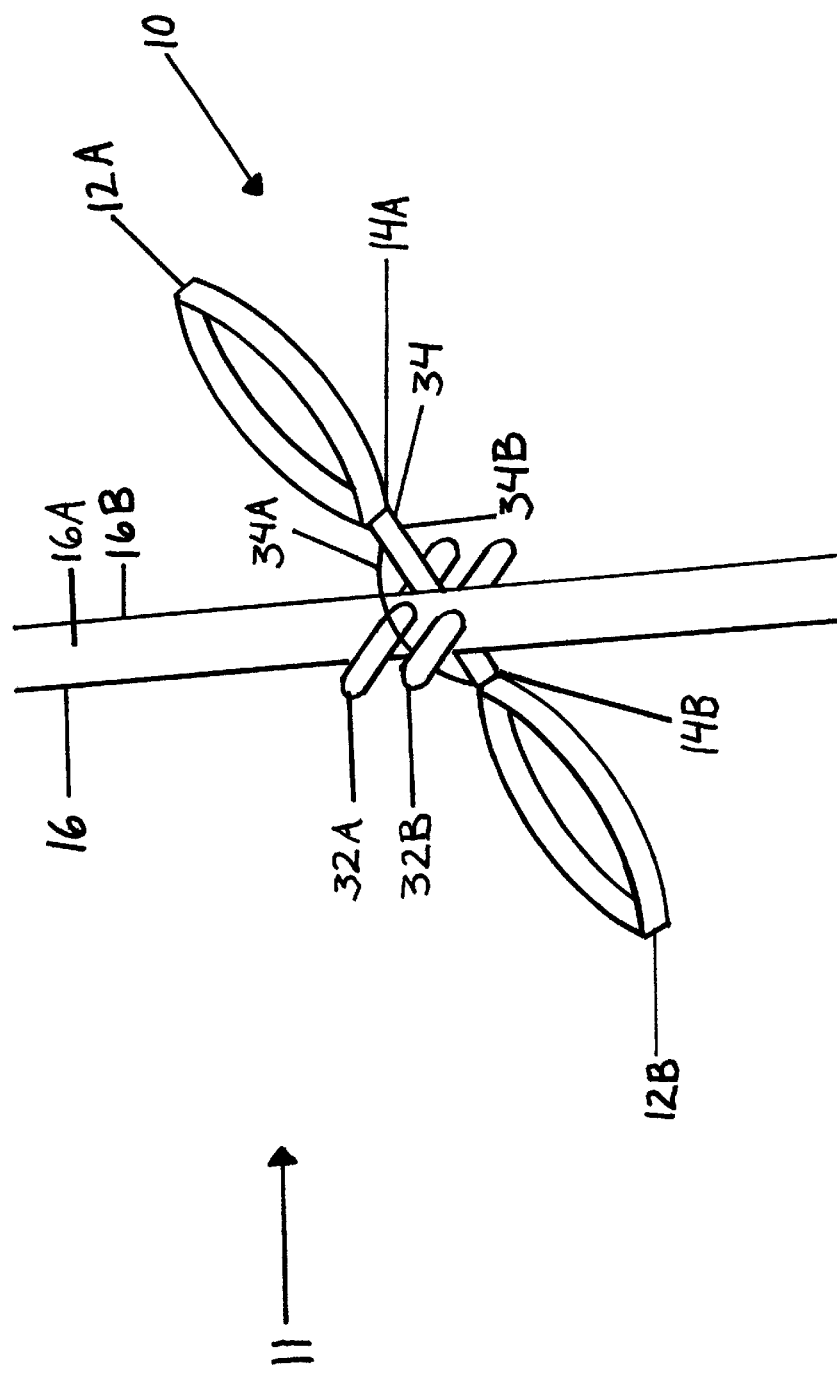
FIG. 4 of the drawings is a fragmented perspective view of a fourth embodiment of a sub-assembly associated with a leash fabricated in accordance with the present invention.

Referring now to FIG. 4, a fourth embodiment of animal waste collection and disposal apparatus 11 may comprise leash 16 which includes a top surface 16A and a bottom surface 16B, pegs 32A and 32B which are spaced apart from one another, and retaining member sub-assembly 34 which includes first and second connecting rods 34A and 34B, respectively, which are positioned between pegs 32A and 32B. First connecting rod 34A is positioned above top surface 16A of leash 16 and second connecting rod 34B is positioned below bottom surface 16B of leash 16.

Pegs 32A and 32B may be fabricated from natural and/or synthetic resins, plastics, woods, metals, alloys, composites, and/or combinations thereof. Pegs 32A and 32B are positioned substantially parallel to each other, thereby bisecting the axis of leash 16 at a substantially perpendicular angle. Pegs 32A and 32B, in cooperation with connecting rods 34A and 34B, prevent first retaining member 12A and second retaining member 12B from moving lengthwise along the leash. Therefore, pegs 32A and 32B are preferably positioned near one another, while allowing for free rotational movement of first retaining member 12A and second retaining member 12B, on the leash as is shown in FIG. 4. Although not shown, first and second retaining members 12A and 12B may be pivotally associated with connecting rod 34B using any one of a number of free-rotation and/or pivoting means.

It will be understood that first and second connecting rods 34A and 34B may be fabricated from natural and/or synthetic resins, plastics, woods, metals, alloys, composites, and/or combinations thereof. Preferably, connecting rods 34A and 34B as well as pegs 32A and 32B are operatively configured so that retaining member sub-assembly 34 is contained at a pre-determined location on leash 16. Retaining member sub-assembly 34 is preferably of a design that allows first and second retaining members 12A and 12B to spin about leash 16 on an axis substantially perpendicular to leash 16.

Retaining member sub-assembly 34 may be fabricated from natural and/or synthetic resins, plastics, woods, metals, alloys, composites, and/or combinations thereof. Retaining member sub-assembly 34 is associated with first and second retaining members 12A and 12B through use of first fastener 14A and second fastener 14B. For purposes of the present disclosure, first fastener 14A and second fastener 14B may comprise non-threaded fasteners, threaded fasteners, snaps, buttons, rivets, clamps, adhesives, and/or stitching.

Use of sub-assembly 10 for use in association with an animal waste collection and disposal apparatus 11 is highly desirous because many conventional animal waste disposal apparati require an animal owner to carry the container of the waste by hand or, alternatively, are complex in their configuration and therefore are costly. In comparison, sub-assembly 10 and, in turn, animal waste collection and disposal apparatus 11 enable an animal owner to collect, store, and/or dispose of animal waste in a non-grotesque and cost-effective manner. In addition, sub-assembly 10 and, in turn, animal waste collection and disposal apparatus 11 substantially preclude inadvertent spillage of animal waste inasmuch as each of the above-identified embodiments facilitate controllably orientating container 18 in a substantially vertical and/or upright manner even during a walk with the animal where the leash is manipulated in a plurality of dynamic vectors.

The foregoing description merely explains and illustrates the invention and the invention is not limited thereto except insofar as the appended claims are so limited, as those skilled in the art who have the disclosure before them will be able to make modifications without departing from the scope of the invention.

What is claimed is:

1. A sub-assembly for use in association with an animal waste collection and disposal apparatus, comprising:
    a leash having a first end and a second end and an attachment site therebetween;
    a hoop, wherein the hoop is associable with the attachment site of the leash, and further wherein the hoop comprises an inner surface and an outer surface, wherein the inner surface is configured for substantial abutment with an outer surface of an associable container to, in turn, retain the associable container therein; and
    at least one fastener, wherein the at least one fastener is capable of securing the hoop to the attachment site of the leash.

2. The sub-assembly according to claim 1, wherein the inner surface of the hoop further includes a lining member for enhancing frictional securement between the hoop and the associable container.

3. The sub-assembly according to claim 1, wherein the hoop comprises a substantially circular inner surface which is configured for substantial abutment with the outer surface of the associable container.

4. The sub-assembly according to claim 3, wherein the inner surface of the hoop further includes a lining member for enhancing frictional securement between the hoop and the associable container.

5. The sub-assembly according to claim 1, wherein the inner surface of the hoop is adjustable.

6. The sub-assembly according to claim 1, wherein the at least one fastener releasably secures the hoop to the attachment site of the leash.

7. The sub-assembly according to claim 1, further comprising a container releasably retained within the hoop.

8. The sub-assembly according to claim 7, wherein the container comprises a cup having a substantially circular horizontal cross-section.

9. The sub-assembly according to claim 1, wherein the hoop is secured to the attachment site of the leash.

10. The sub-assembly according to claim 9, wherein the hoop is pivotally secured to the attachment site of the leash.

11. A sub-assembly for use in association with an animal waste collection and disposal apparatus, comprising:
    a leash having a first end and a second end and an attachment site therebetween;
    a hoop, wherein the hoop comprises an inner surface and an outer surface, wherein the inner surface is configured for substantial abutment with an outer surface of an associable container to, in turn, retain the associable container therein;
    a rod, wherein the rod is associated with the hoop, and further wherein the rod is suspendable in a substantially vertical orientation from the attachment site of the leash; and
    a fastener, wherein the fastener is capable of securing the rod to a leash.

12. The sub-assembly according to claim 11, wherein the inner surface of the hoop further includes a lining member for enhancing frictional securement between the hoop and the associable container.

13. The sub-assembly according to claim 11, wherein the hoop comprises a substantially circular inner surface which is configured for substantial abutment with the outer surface of the associable container.

14. The sub-assembly according to claim 13, wherein the inner surface of the hoop further includes a lining member for enhancing frictional securement between the hoop and the associable container.

15. The sub-assembly according to claim 11, wherein the inner surface of the hoop is adjustable.

16. The sub-assembly according to claim 11, wherein the fastener releasably secures the rod to the attachment site of the leash.

17. The sub-assembly according to claim 11, further comprising a container releasably retained within the hoop.

18. The sub-assembly according to claim 17, wherein the container comprises a cup having a substantially circular horizontal cross-section.

19. The sub-assembly according to claim 11, wherein the rod is secured to the attachment site of the leash.

20. The sub-assembly according to claim 19, wherein the rod is pivotally secured to the attachment site of the leash.

21. The sub-assembly according to claim 19, wherein the attachment site of the leash comprises a substantially circular aperture.

22. The sub-assembly according to claim 11, wherein a rod end proximate the hoop comprises a weighting member.

23. An animal waste collection and disposal apparatus, comprising:

a leash, wherein the leash includes a top surface and a bottom surface and two pegs spaced apart from one another; and a hoop sub-assembly, wherein the hoop sub-assembly includes first and second connecting rods positioned between two hoops, wherein the first and second connecting rods are positioned between the two pegs, and wherein the first connecting rod is positioned above the top surface of the leash and the second connecting rod is positioned below the bottom surface of the leash.

24. An animal waste collection and disposal apparatus, comprising:

a leash, wherein the leash includes a top surface, a bottom surface, and a substantially circular aperture;

a hoop, wherein the hoop is configured to retain a container for collecting and disposing animal waste;

a rod, wherein the rod comprises a circumference less than a circumference of the aperture of the leash, and wherein the rod includes an end which emanates from the bottom surface of the leash through the aperture, and further wherein the rod is suspendable in a substantially vertical orientation; and a fastener, wherein the fastener is associated with the top surface of the leash and secured to the end of the rod which emanates through the aperture.

25. The animal waste collection and disposal apparatus according to claim 24, wherein the fastener comprises a substantially spherical lower region which contacts the aperture of the leash.

* * * * *